United States Patent
Li

(10) Patent No.: US 8,666,213 B2
(45) Date of Patent: Mar. 4, 2014

(54) METHOD OF MAKING MULTIMODE OPTICAL FIBERS

(75) Inventor: Ming-Jun Li, Horseheads, NY (US)

(73) Assignee: Corning Incorporated, Corning, NY (US)

(*) Notice: Subject to any disclaimer, the term of this patent is extended or adjusted under 35 U.S.C. 154(b) by 206 days.

(21) Appl. No.: 13/214,554

(22) Filed: Aug. 22, 2011

(65) Prior Publication Data

US 2013/0051747 A1 Feb. 28, 2013

(51) Int. Cl.
*G02B 6/028* (2006.01)

(52) U.S. Cl.
USPC .......................................................... 385/124

(58) Field of Classification Search
None
See application file for complete search history.

(56) References Cited

U.S. PATENT DOCUMENTS

| | | | |
|---|---|---|---|
| 3,687,514 A | 8/1972 | Miller et al. |
| 3,909,110 A | 9/1975 | Marcuse et al. |
| 3,912,478 A | 10/1975 | Presby |
| 3,969,016 A | 7/1976 | Kaiser et al. |
| 4,049,413 A | 9/1977 | French |
| 4,093,343 A | 6/1978 | Hargrove |
| 4,236,786 A | 12/1980 | Keck |
| 6,542,679 B2 | 4/2003 | DiGiovanni et al. |
| 6,735,985 B2 | 5/2004 | DiGiovanni et al. |
| 7,043,128 B2 | 5/2006 | DiGiovanni et al. |
| 2009/0169163 A1 | 7/2009 | Abbott, III et al. |

FOREIGN PATENT DOCUMENTS

| | | |
|---|---|---|
| EP | 1101744 | 5/2001 |
| EP | 1325894 | 7/2003 |

*Primary Examiner* — Jerry Rahll
(74) *Attorney, Agent, or Firm* — Robert L. Carlson

(57) ABSTRACT

A multimode optical fiber is drawn form an optical fiber preform, and during said drawing step, a series of perturbations are imparted to the fiber along the length of the optical fiber, said perturbations exhibiting a non-constant amplitude or repeat period.

15 Claims, 1 Drawing Sheet

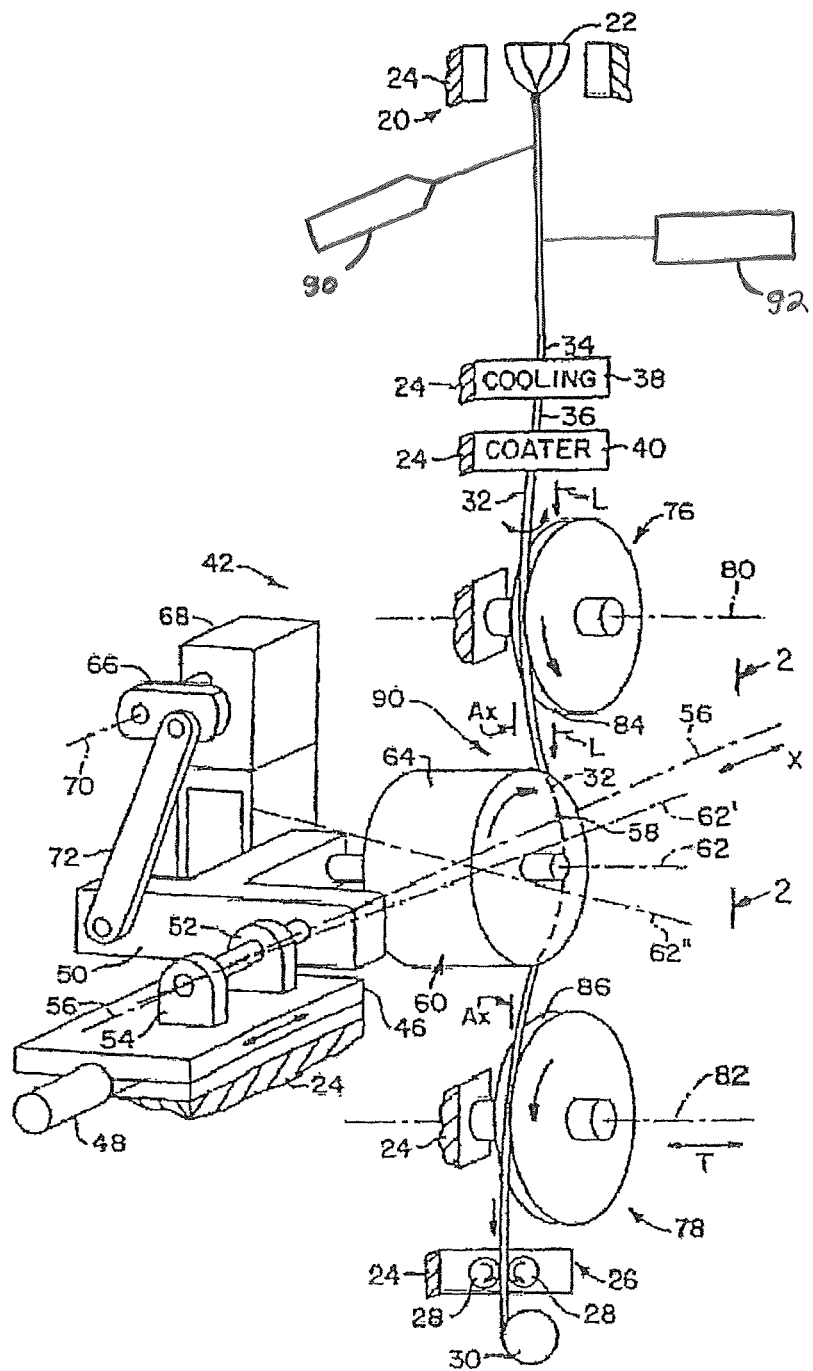

METHOD OF MAKING MULTIMODE OPTICAL FIBERS

BACKGROUND

The disclosure relates to multimode optical fibers and methods for their manufacture, and more particularly to methods for imparting perturbations to multimode optical fibers and the resultant optical fibers.

High bandwidth multimode fibers are attractive for data center applications. In order to obtain high bandwidth, multimode optical fiber refractive index profiles are typically designed to exhibit an alpha-profile shape having an with alpha between about 1.7 and 2.3. However, optical fiber bandwidth can be sensitive to refractive index profile fluctuations and errors that inevitably occur during the manufacturing process. These profile fluctuations and errors can be divided into two types: alpha error and non alpha error. An alpha-error is an overall profile deviation from an ideal alpha-profile. Non-alpha errors are relatively small index fluctuations around an ideal profile such as centerline defect, profile diffusion tail, and random index fluctuations such as small spikes or dips that occur in the refractive index profile. It is believed that the non-alpha errors can tend to split modes in each mode group, thereby increasing the time delay spread between all of the mode groups. Such non-alpha errors are very difficult to entirely avoid in practical optical fiber manufacturing processes. One way to fix the non-alpha errors is to improve profile controls in fiber manufacturing process. However, it is very hard to reduce all minor index fluctuations to the point where high bandwidth (e.g. 3-4 GHzKm or greater) can be achieved.

SUMMARY

One aspect relates to a method of making a multimode fiber comprising drawing said fiber form an optical fiber preform, and during said drawing step, imparting a series of perturbations along the length of the optical fiber, said perturbations exhibiting a repeat period which varies along the length of the fiber. A perturbation as used herein is change in refractive index in the core or clad of the optical fiber which is large enough to impact light propagation along the fiber.

Another aspect relates to an optical fiber comprising a gradient index core, said fiber comprising a series of perturbations along the length of the optical fiber, said perturbations exhibiting a repeat period which varies along the length of the fiber.

By employing controlled refractive index perturbations along the length of the multimode optical fiber, mode coupling may be is caused in each mode group. In one embodiment, the longitudinal axis of the fiber has a spin impressed on the fiber, wherein over at least a portion of the fiber the spin impressed on the fiber is alternately clockwise and counter-clockwise, with a spin repeat distance in the optical fiber of at least 5 cm and less than 100 cm, and with a plurality of varying spin reversal distances occurring along the length of the multimode optical fiber, wherein the plurality of varying spin reversal distances comprises a minimum spin reversal distance and a maximum spin reversal distance. However, in all of the examples and embodiments disclosed herein, alternative methods can be used to impart the perturbations, e.g. contacting the fiber with an air jet to locally cool the fiber during the manufacturing process, or contacting the fiber with a laser to locally heat the fiber during the manufacturing process. The frequency modulated spin profiles employed herein can be of any shape perturbations exhibiting a non-constant amplitude or repeat period.

Preferably, the spin profile employed to impart the frequency modulated spin is of a non constant periodic shape wherein the fiber is spun first clockwise and then counter-clockwise. Additionally, rather than varying the period of the perturbation, the amplitude of the perturbation may be varied along the length of the fiber to achieve the same intra-mode coupling.

In some embodiments, the spin functions are not substantially sinusoidal and they have sufficient variability to provide a substantial increase in bandwidth of the optical fiber (e.g. 30-50% improvement). Whether or not a particular spin function is "substantially sinusoidal" can be determined by performing a complex Fourier analysis of the spin function and comparing the magnitudes of the coefficients for the various components of the function determined thereby. The complex Fourier analysis is performed using conventional techniques well known in the art. A spin function is substantially sinusoidal when the magnitude of the coefficient for one of its oscillatory components (the fundamental component) dominates the magnitudes of the coefficients for all other oscillatory components (the secondary components) as well as the coefficient for any constant component. In quantitative terms, domination occurs when the magnitude of the coefficient for the fundamental component is at least about three times the magnitude of the coefficient for each of the secondary components and the coefficient of the constant component. In some embodiments, both frequency and amplitude modulation are performed along the length of the fiber to achieve an optimum increase in bandwidth. When so varied, the spinning achieves transfer of energy between modes (mode coupling) for a variety of modes. Such energy transfer is highly effective in improving bandwidth of multimode fibers.

The period of index perturbation is preferably in the range of about 5 cm to 100 cm, more preferably 10 cm to 60 cm, and the frequency is preferably in the range of about 1 to 20 meter$^{-1}$, more preferably about 1.7 to 10 meter$^{-1}$. The proposed method minimizes time delays that would otherwise occur due to non-alpha errors for each mode group of a multimode optical fiber by introducing controlled mode coupling within each mode group, or intra-mode coupling, thereby increasing the bandwidth of the optical fiber. This solution is easier to implement than improving the optical fiber preform manufacturing process to eliminate all possible non-alpha errors, resulting in lower cost MMF.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiment(s), and together with the description serve to explain principles and operation of the various embodiments.

BRIEF DESCRIPTION OF THE DRAWINGS

FIG. 1 is a schematic drawing showing a fiber manufacturing process capable of implementing the methods disclosed herein.

DETAILED DESCRIPTION

We have found that one way to reduce the time delay spread which would otherwise be caused by non-alpha refractive index profile errors is to introduce controlled mode coupling. Rather than focus on mode coupling between different mode groups, which could result in an attenuation penalty, the methods disclosed herein result in coupling within each mode group, i.e. intra-mode coupling. If the modes in each mode group couple to each other, they will travel with an average speed. As a result, the time delays are averaged out among the modes in each mode group and the time delays among different mode groups are reduced.

To create mode coupling between two modes, a periodic index perturbation along the fiber is required to achieve phase matching. The period of the perturbation may be determined by the phase matching condition between the two modes. If the difference in propagation constant is $\Delta\beta$ and the difference in effect index between the two modes is $\Delta n_{eff}$, the period of the perturbation is determined by $$\Lambda = \frac{2\pi}{\Delta\beta} = \frac{\lambda}{\Delta n_{eff}} \quad (1)$$

or the spatial frequency is calculated by $$f = \frac{1}{\Lambda} = \frac{\Delta n_{eff}}{\lambda} \quad (2)$$

where $\lambda$ is the operating wavelength.

The perturbation periods needed for intra-mode coupling depends mostly on core delta and core radius of the multi-mode optical fiber. In general for multimode fibers, the range of period needed to achieve intramode coupling is between 5 cm to about 1 m (or frequency 20 and 1 meter$^{-1}$), more preferably between 5 to 80 cm (frequency 20 to 1.25 meter$^{-1}$, and even more preferably between 5 to 50 cm (20 to 2 meter$^{-1}$). To have an efficient mode mixing within a mode group, the frequency of perturbation should preferably not be constant, rather the frequency should be non-periodic. Preferably, more than 2 frequencies in the range of 1 to 20 m$^{-1}$ is present in the index perturbations which are impated to the optical fiber, more preferably, more than 5, even more preferably more than 10.

Different techniques can be used to introduce the index perturbations along the fiber to create mode coupling within each mode group. In one embodiment, fiber spinning is used to create period index perturbations. Because multimode fibers typically have certain index perturbations due to core asymmetries such as core geometry deformations and core/clad concentricity imperfections, fiber spinning can be used to create a non-periodic change of these index defects along the length of the optical fiber, resulting intra-mode coupling.

Any apparatus which is capable of spinning the fiber during the fiber drawing process and is also capable of varying the frequency of the spin (and optionally the amplitude of the spin) may be used to carry out the methods of the present invention. FIG. 1 illustrates such an apparatus which is capable of producing the spin functions disclosed herein to impart the desired spin to the optical fiber. Referring to FIG. 1, furnace 20 is adapted to hold a multimode optical fiber preform 22 of the type commonly utilized in optical fiber drawing procedures. Furnace 20 is mounted to a frame 24 which, for example, may be the frame of a building in which the fiber drawing operation is conducted. A takeoff or pulling stand 26 having a pair of opposed draw rollers 28 is provided downstream of furnace 20. Stand 26 includes conventional elements (not shown) as such electromechanical drive systems for turning rollers 28 about their axes so as to draw a fiber engaged there between. A take up optical fiber reel or optical fiber storage spool 30 is also provided. The fiber storage spool is also driven by conventional equipment (not shown) in rotation about an axis fixed relative to frame 24 so as to wind fiber from stand 26 onto the reel. Furnace 20 is arranged to maintain at least a portion of multimode optical fiber preform 22 in a soft, substantially molten condition. Stand 26 is arranged to pull a fiber 32 from the molten portion of preform 22 so that the fiber passes along a substantially predetermined path.

In a hot zone or melt zone 34 adjacent the upstream end of the path, the fiber is substantially molten. However, as the fiber moves downstream along the path, it is cooled and solidified so that when the fiber reaches a point 36 considerably downstream from furnace 20, the fiber has cooled to a substantially solid state. The region of the path extending from point 36 to the downstream end of the path is referred to herein as the "solid region" of the path. Cooling devices 38 may be provided between the melt zone and the solid zone. Desirably, the cooling device provides non-contact cooling, such that no solid object touches the surface of the fiber while it cools.

One or more coating devices 40 are also mounted to frame 24 in solid zone 36. The coating devices are adapted to apply one or more protective polymeric coatings on the outside of the fiber. Preferably, the coating devices is also a non-contact device. That is, the fiber passes through coater 40 without contacting or engaging any other solid object. The foregoing elements of the apparatus may be of conventional design as commonly utilized in the optical fiber drawing art. The apparatus may further include additional guide rollers (not shown) adjacent to downstream end of path 32, for diverting the fiber and hence the path from a straight line and for further constraining the fiber in the path.

The spin-forming apparatus includes an adjustable carriage slidably mounted to frame 24 for movement in cross-path directions X transverse to the longitudinal direction of path 32. A micrometer adjustment device 48 is provided for moving the carriage in the cross-path directions and for locking the carriage in place once the same has been adjusted to the desired location relative to frame 24. A yoke 50 is mounted to carriage 46 by a shaft 52 and bearings 54 so that yoke 50 is pivotable relative to carriage 46 and hence relative to frame 24 about a rocking axis 56 extending in the cross-path directions X and intersecting path 32 at a point of intersection 58.

Spin-imparting assembly 42 further includes a cylindrical first roller 60 mounted to yoke 50 for rotation about a first element axis 62. Roller 60 has a circumferential surface 64 encircling first element axis 62 and coaxial therewith. The frame of a motor 68 is mounted to carriage 46. A crank 66 is supported on the shaft of motor 68 so that the motor can turn crank 66 around an axis 70 parallel to the rocking axis 56. A connecting rod 72 has one end pivotally connected to crank 66 remote from its axis 70 and has the opposite end pivotally connected to yoke 50 remote from rocking axis 56. Thus, rotation of crank 66 about crank axis 70 will drive yoke 50 in a rocking motion about rocking axis 56 between a first extreme position in which the roller axis or first element axis 62 is tilted to the position indicated in broken lines at 62' in FIG. 15 and a second extreme position in which the roller axis or first element axis 62 is tilted in the opposite direction to the position shown in broken lines at 62" in FIG. 15. Extreme positions 62' and 62" are disposed at equal but opposite extreme tilt angles E1 and E2 from a nominal position 62 in which the roller axis or first element axis is perpendicular to the longitudinal direction of path 32. In all positions of the roller including these extreme positions, however, the roller axis 62 remains generally transverse to the longitudinal direction of the path. Desirably, each extreme angle E is between about 2 and about 10 degrees from nominal position. As further, discussed below, the desired angle depends upon the desired amount of spin to be imparted to the fiber. The angles E may be adjusted by adjusting the dimension of crank 66 and particularly, the spacing between the pin joint of connection rod 72 and axis 70. The speed of rotation of motor 68 determines the rate at which the yoke 50 and first element 60 will rock between the two extreme positions. Motor 68 may be an adjustable speed device such as a stepper motor driven by a digital control system of the conventional type, a DC motor driven by an adjustable voltage source, an air motor driven by an adjustable gas source, or any other conventional variable-speed motor. Alternatively, motor 68 may be fixed-speed device. Such spinning devices are further described in U.S. Pat. No. 6,324,872, the specification of which is hereby incorporated by reference.

In order to achieve intra mode coupling, the spin amplitude is preferably maintained between 0.5 to 20 turns/meter, and the spin period is maintained between 0.1 to 100 m. For effectively couple all the modes in a mode group, it is preferable that the spinning be applied with a non-constant repeat period or amplitude, e.g. the spin period or amplitude varies along the length of the optical fiber. For example, the spin amplitude or the period, or both, may be modulated. In this way, a multimode optical fiber can be made which comprises a series of perturbations along the length of the optical fiber, said perturbations exhibiting a repeat period or amplitude which varies along the length of the fiber, such that intra mode coupling occurs and thereby improved the bandwidth of the optical fiber.

In another embodiment, periodic perturbations may be introduced by blowing an air jet (jets) to the draw root region via air jet 90. The air jet may be controlled to switch on and off at a desired time frequency to create periodic geometric deformation and index change due to stress effect by cooling. The control time frequency is preferably in the range of 10 Hz to 500 Hz, depending on the draw speed. Preferably the frequency is not constant, and varies to create perturbation period in the range of 5 to 100 cm along the length of the optical fiber.

In yet another embodiment, the perturbations may be introduced by using a pulse laser beam emitted from laser source 92. Lasers with wavelengths from UV to IR can be used as laser source 92. In one embodiment, the laser is a UV laser, for example, Argon ion laser. A germanium-doped MMF is photosensitive. The refractive index of the core changes with exposure to UV light, which create index perturbation in the fiber. In another embodiment, the laser is CO2 laser with wavelength of 10.6 microns. Due to high absorption of glass at this wavelength, fiber is heated to the softening temperature, causing glass deformation. The laser repetition rate is controlled in the range of 10 Hz to 500 Hz to create a perturbation period in the range of 5 to 100 cm.

It will be apparent to those skilled in the art that various modifications and variations can be made without departing from the spirit or scope of the claims.

What is claimed is:

1. A method of making a multimode fiber comprising drawing said fiber form an optical fiber preform, and during said drawing step, imparting a series of perturbations along the length of the optical fiber, said perturbations exhibiting a non-constant amplitude or repeat period, and the amplitude of the perturbation is modulated along the length of the fiber.

2. The method of claim 1, wherein said imparting perturbations step comprises imparting a spin to said fiber.

3. The method of claim 2, wherein said perturbations are imparted to said fiber and wherein the frequency of the period of the perturbation is modulated along the length of the fiber.

4. The method of claim 2, wherein said imparting a spin to said fiber comprises spinning said fiber at a non-constant repeat period.

5. The method of claim 4, wherein said non-constant repeat period comprises a plurality of periods between 5 cm and 1 m.

6. The method of claim 1, wherein said perturbations are imparted to said fiber and wherein the amplitude of the period of the perturbation is modulated along the length of the fiber.

7. The method of claim 1, wherein said perturbations are imparted to said fiber and wherein the frequency of the period of the perturbation is modulated along the length of the fiber.

8. A method of making a multimode fiber comprising drawing said fiber form an optical fiber preform, and during said drawing step, imparting a series of perturbations along the length of the optical fiber using an air jet or a laser, said perturbations exhibiting a non-constant amplitude or repeat period.

9. A method making a multimode fiber comprising drawing said fiber for an optical fiber preform, and during said drawing step, imparting a series of perturbations along the length of the optical fiber, said perturbations exhibiting a non-constant amplitude or repeat period, wherein said imparting perturbation step comprises spinning said fiber at a non-constant amplitude.

10. An optical fiber comprising a gradient index core, said fiber comprising a series of perturbations along the length of the optical fiber, said perturbations exhibiting a repeat period or magnitude which varies along the length of the fiber.

11. The fiber of claim 10, wherein said fiber perturbations comprise a spin which is imparted to said fiber.

12. The fiber of claim 11, wherein the amplitude of the period of the perturbation is modulated along the length of the fiber.

13. The fiber of claim 11, wherein the frequency of the period of the perturbation is modulated along the length of the fiber.

14. The fiber of claim 10, wherein the amplitude of the period of the perturbations is modulated along the length of the fiber.

15. The fiber of claim 10, wherein the frequency of the period of the perturbation is modulated along the length of the fiber.

* * * * *